May 29, 1956  A. G. SCHILBERG  2,747,887
BOX FRAME BULKHEAD
Filed Nov. 6, 1953
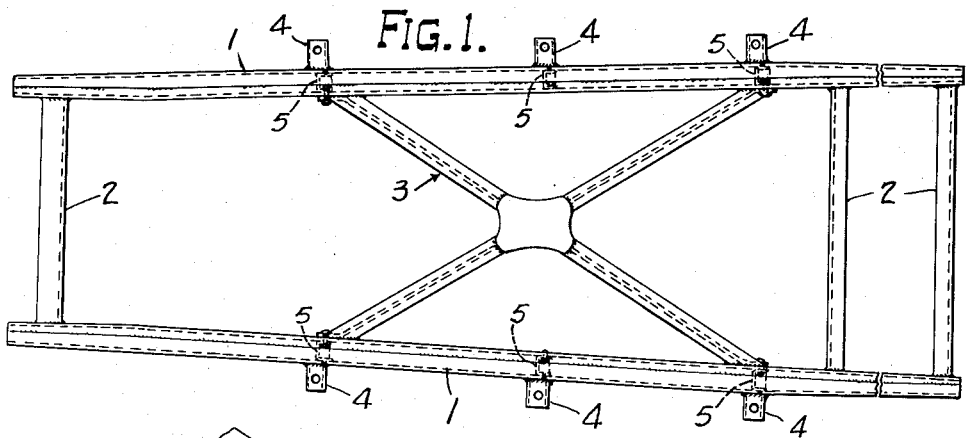
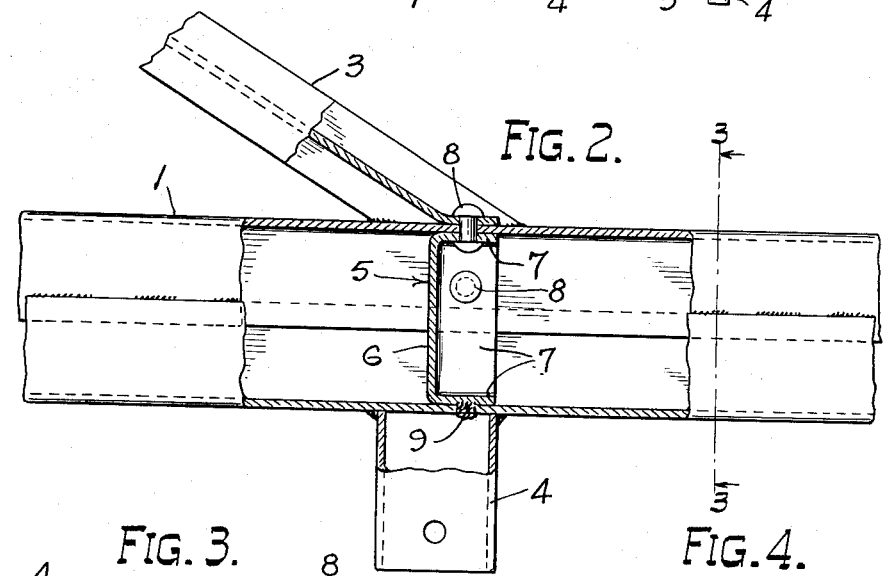
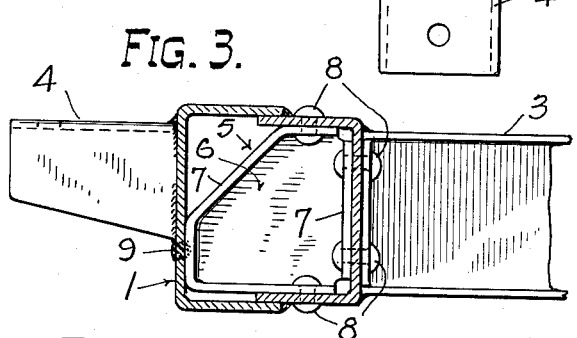
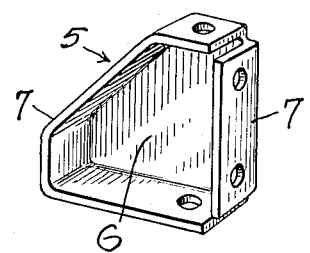
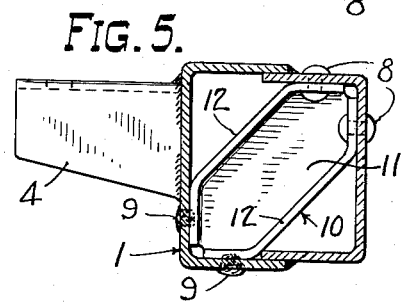
INVENTOR.
Arnold G. Schilberg
BY
Andrus & Sceales
ATTORNEYS.

# United States Patent Office 2,747,887
Patented May 29, 1956

2,747,887

BOX FRAME BULKHEAD

Arnold G. Schilberg, Milwaukee, Wis., assignor to A. O. Smith Corporation, Milwaukee, Wis., a corporation of New York Application November 6, 1953, Serial No. 390,516

3 Claims. (Cl. 280—106)

This invention relates to an automotive frame, and more particularly to a bulkhead for a box frame structure.

An object of the invention is to increase the rigidity of a box frame at little extra cost.

Another object of the invention is to prevent parallelogramming of the frame members due to weight loading and other forces to which the frame is subjected.

Another object is to equip the frame members in a manner to permit the use of thinner sheet stock in frame fabrication without a consequent decrease in the rigidity of the frame.

Another object is to permit use of thinner sheet stock in frame fabrication and thus reduce the cost of materials in a frame.

In essence, the invention comprises a vehicle frame having a pair of spaced rectangular section side rails which are acted on by a plurality of external forces tending to distort the rectangular cross section thereof.

To prevent this distortion of the side rails which is referred to as parallelogramming, a plurality of shear plates or bulkheads are secured within the side rails at the position of the external forces. The bulkheads may assume a variety of shapes and serve to prevent parallelogramming of the rectangular section in service.

These and other objects of the invention will appear hereinafter in connection with the following description of various embodiments of the invention shown in the accompanying drawing in which:

Figure 1 is a top plan view of an automobile frame embodying the invention;

Fig. 2 is a top plan fragmentary view of the frame, partly in section, showing one form of bulkhead;

Fig. 3 is a view on line 3—3 of Fig. 2 showing the frame in transverse section;

Fig. 4 is a perspective view of the bulkhead shown in Figures 1 through 3; and

Fig. 5 is a view similar to Fig. 3 showing another form of bulkhead.

If a rectangular box member is restrained at one end and is subjected to a twisting effect throughout its length, the member will retain its original rectangular cross-section at all points along its length. In operation a vehicle side rail frame member is subject to a certain amount of torsional movement. In Patent No. 2,311,880 issued to D. W. Sherman, it was shown how the torsional rigidity of a box section side rail may be increased by the use of a bracing unit or bulkhead placed within the box section.

If, however, an external force operates somewhere along the length of the twisted member, the normal twisting action on the member is disrupted with a resulting deformation of the rectangular cross-section to that of a parallelogram at the point where the external force is applied. With the box-shaped side rails, the body weight, supported by body brackets attached to the side rails, causes parallelogramming of the side rails at the points where the body support brackets are attached. In the case of open body or convertible construction similar parallelogramming results in the box frame members at points where the X-frame members are attached to the box frame members. Both the body support brackets with their loading and the effect of the X-frame members act as external forces to disrupt normal twisting of the box frame members and result in parallelogramming of the box members. The present invention is directed to the use of a bulkhead or shear plate in the box section side rails at points where external forces are applied, not only to increase the torsional rigidity of the side rails, but also to prevent parallelogramming of the side rail.

Referring to the drawings, an automotive frame is shown in Figure 1 comprised of a pair of transversely spaced longitudinally extending hollow side rails 1 of box shape or rectangular section which are connected adjacent the outer ends by cross members 2. Where strength and rigidity factors so dictate, as in the open body or convertible construction, an X-frame member 3 is disposed between the side rails 1. The X-frame member 3 is an integral structure and the ends of the respective arms of member 3 are secured to rails 2 by suitable means such as by rivets or welding or a combination thereof.

A plurality of body supports 4 are suitably welded to the side rails 1 and extend outwardly therefrom for attachment of the automotive body, not shown, to the frame.

To increase the torsional rigidity and to prevent parallelogramming of the walls of each side rail 1, bulkheads 5 are secured within the side rails 1 at locations where external forces act on the side rails, such as at the intersection or area of attachment of body support brackets 4 and X-frame member 3 to rails 1.

The bulkheads 5 may assume a variety of shapes. The bulkheads may be coextensive with the inside area of the box frame section or only a part thereof. If it is desired that the bulkhead be subjected to tensile or compressive stresses only, and no bending stress, the material of which the bulkhead is made should extend between diagonal corners of the side rail 1. Where the bulkhead is subjected to bending stresses as well as compressive or tensile stresses, corresponding allowance must be made in the thickness of the bulkhead.

Figures 1, 2 and 3 show a form of bulkhead 5 disposed transversely of a rail 1 at the intersection of the rail and one of the arms of X-frame member 3. Bulkhead 5 may be formed of sheet steel, as by stamping, and is comprised of a generally triangular vertically extending web 6 provided with perimetral flanges 7 at right angles to the web and disposed to secure the bulkhead within side rail 1. The bulkhead 5 is subjected to tensile or compressive stresses only. Whether the stresses in bulkhead 5 are in tension or compression depends on which side of the side rail 1 the load is applied. The bulkhead 5 is secured within the side rail 1 by welding or riveting, or both. As shown in Figs. 2 and 3, the bulkhead 5 is secured by both riveting and welding. Rivets 8 secure the upper and lower flanges 7 to the top and bottom walls of the side rails. Rivets 8 also join one side flange 7 to the side wall of the box shaped rail 1 and a plug weld 9 secures the other side flange 7 to the other side wall of rail 1. In Fig. 2 the rivet 8 also extends through the frame member 3 at the intersection between the frame member and bulkhead 5.

Another form of bulkhead is shown in Fig. 5. The bulkhead 10 of Fig. 5 comprises a generally hexagonal web 11 extending between diagonal corners of the hollow box shaped side rail and having a flange 12 disposed around the periphery thereof. Bulkhead 10 is secured diagonally within the side rail by welds to the bottom and one side wall and rivets to the top and other side wall and is subjected to tension or compression stresses depending on which side of the side rail 1 the load is applied. This bulkhead is illustrated as located at the intersection between rail 1 and body support brackets 4.

The placing of bulkheads within the box section side rails at locations where the side rail is acted on by external forces due to stresses on the X-frame 3 or body support brackets 4 increases the rigidity of the rail by as much as 20% and minimizes the tendency of the rail walls to parallelogram. The use of bulkheads as described permits fabrication of the frame from thinner sheet stock without a decrease from the required standard of rigidity. The resulting saving in the cost of frame materials far outweighs the cost of the simple bulkhead of the invention.

Various modes of carrying out the invention are contemplated as within the scope of the following claims particularly pointing out and distinctly claiming the subject matter which is regarded as the invention.

I claim:

1. In a vehicle frame, a pair of horizontally spaced integrally joined hollow side rails having walls of rectangularly shaped cross-section, an X-frame member disposed between the side rails with the spaced arms thereof extending only to the inner wall of the side rails and secured to said wall at the meeting juncture of the arms and walls, body support members extending horizontally outwardly from each side rail and secured to the side rails, said X-frame member and said body support members acting under load in service as external forces on the side rails and tending to deform the rectangular section thereof and effect parallelogramming of said rails, and a bulkhead disposed within the side rails transversely of the same at locations therein generally centrally of the junctures respectively between the said rails and the X-member arms and body support members where said members are secured to the side rails to counteract said external forces, said bulkheads extending to each of the four walls of the respective rails to increase the rigidity of the side rails and prevent parallelogramming of each rail in service.

2. In a vehicle frame, a pair of horizontally spaced integrally joined hollow side rails having walls of generally rectangular shaped cross-section, an X-frame member disposed between said side rails with the spaced arms thereof extending only to the inner wall of the side rails and secured to said wall at the meeting juncture of the arms and walls, said X-member in service tending to deform the rectangular section of said side rails and parallelogram the rails at the intersection with the rails, a bulkhead disposed within the side rails transversely of the same at the intersections between the side rails and the arms of the X-frame member to counteract the tendency of the rails to distort, said bulkhead being formed of a web section and a flange extending perpendicular thereto, and means securing the flange of the bulkhead to each of the four walls of each rail to increase the rigidity of the side rails and prevent parallelogramming of each rail in service.

3. In a vehicle frame for supporting a vehicle body, a pair of horizontally spaced integrally joined side rails having walls of generally rectangular shaped cross-section, body support members extending horizontally outwardly from the side rails and secured to each of said rails for attachment of said vehicle body to the side rails, said members and the attached vehicle body in service tending to distort the rectangular section of the side rails at the locations of said members and effect parallelogramming of the rails, a bulkhead disposed within the side rails transversely of the same at each location of said body supports to counteract the tendency of the rails to distort, said bulkhead being formed of a web section and a flange extending perpendicular thereto, and means securing the flange of the bulkhead to each of the four walls of each rail to increase the rigidity of the side rails and prevent parallelogramming of each rail in service.

References Cited in the file of this patent
UNITED STATES PATENTS

| | | |
|---|---|---|
| 2,096,996 | Parker | Oct. 26, 1937 |
| 2,229,371 | Chayne | Jan. 21, 1941 |
| 2,311,880 | Sherman | Feb. 23, 1943 |
| 2,621,059 | Ridgway | Dec. 9, 1952 |